United States Patent
Song et al.

(10) Patent No.: US 8,244,266 B2
(45) Date of Patent: Aug. 14, 2012

(54) SCHEDULING METHOD IN A CELLULAR SYSTEM USING WIRED RELAY STATION

(75) Inventors: Ki-Uk Song, Suwon-si (KR); Seong-Taek Hwang, Gyeonggi-do (KR); Won-Jin Sung, Seoul (KR); Jin-Woo Choe, Seoul (KR); Gwy-Un Jin, Seoul (KR); Seong-Min Kim, Seoul (KR)

(73) Assignees: Samsung Electronics Co., Ltd., Samsung-ro, Yeongtong-gu, Suwon-si, Gyeonggi-do (KR); Industry-University Cooperation Foundation, Sogang University, Sinsu-Dong, Mapo-Gu, Seoul (KR)

( * ) Notice: Subject to any disclaimer, the term of this patent is extended or adjusted under 35 U.S.C. 154(b) by 995 days.

(21) Appl. No.: 11/977,603

(22) Filed: Oct. 25, 2007

(65) Prior Publication Data

US 2008/0125136 A1    May 29, 2008

(30) Foreign Application Priority Data

Nov. 23, 2006    (KR) .................. 10-2006-0116356

(51) Int. Cl.
    *H04W 72/00*       (2009.01)
(52) U.S. Cl. ............. 455/452.1; 370/538; 370/322; 370/498; 370/509; 370/395.4; 370/329; 370/341; 370/264; 370/437; 370/468
(58) Field of Classification Search .......... 370/395.4, 370/395.41, 329, 341, 437, 468, 450, 452.1, 370/464, 509
See application file for complete search history.

(56) References Cited

U.S. PATENT DOCUMENTS

| | | | |
|---|---|---|---|
| 7,676,194 B2 * | 3/2010 | Rappaport | 455/11.1 |
| 2004/0071110 A1 | 4/2004 | Guey et al. | |
| 2005/0014464 A1 * | 1/2005 | Larsson | 455/11.1 |
| 2005/0201281 A1 | 9/2005 | Damnjanovic et al. | |
| 2007/0081491 A1 * | 4/2007 | Kim et al. | 370/329 |

FOREIGN PATENT DOCUMENTS

| | | |
|---|---|---|
| KR | 2005-20576 | 3/2005 |
| KR | 2005-62359 | 6/2005 |
| KR | 2006-112962 | 11/2006 |
| WO | WO 02/085061 | 10/2002 |

* cited by examiner

*Primary Examiner* — Dwayne Bost
*Assistant Examiner* — Edward Zhang
(74) *Attorney, Agent, or Firm* — Cha & Reiter, LLC

(57) ABSTRACT

A method, apparatus and computer product for scheduling in a cellular system using a wired RS is disclosed. In one aspect, a BS collects CQIs of all MSs within a cell, calculates a transmittable data amount for each of the MSs according to the CQI, selects an MS having a highest PF metric, and allocates resources to the selected MS.

16 Claims, 7 Drawing Sheets

SCHEDULING METHOD IN A CELLULAR SYSTEM USING WIRED RELAY STATION

CLAIM OF PRIORITY

This application claims the benefit of the earlier filing date, under 35 U.S.C. §119(a), to that patent application filed in the Korean Intellectual Property Office on Nov. 23, 2006 and assigned Serial No. 2006-116356, the entire disclosure of which is hereby incorporated by reference.

BACKGROUND OF THE INVENTION

1. Field of the Invention

The present invention relates to a scheduling and Radio Resource Management (RRM) technique in a cellular communication system. More particularly, the present invention relates to a method for, increasing the transmission throughput of a system by variably adjusting the boundaries among frame segments.

2. Description of the Related Art

Starting from the $1^{st}$ Generation (1G) analog mobile communications including Advanced Mobile Phone Service (AMPS), wireless communication systems have evolved from 2G digital mobile communications utilizing Code Division Multiple Access (CDMA) and Time Division Multiple Access (TDMA) to 3G multimedia mobile communications known as International Mobile Telecommunications-2000 (IMT-2000) to 4G. Since 3G, the evolution has focused on provisioning of services at high rate under a wide range of environments, meeting users' demands for a variety of wireless multimedia services beyond the traditional voice communication service.

One of critical technologies behind the evolution is efficient management and distribution of frequency resources. In this context, active studies have been conducted on multi-hop transmission schemes beyond single-hop schemes, which allow only direct transmission from a Base Station (BS) to a Mobile Station (MS) in a cell. A multi-hop relay system enables both relayed transmission from a BS to an MS via an RS (Relay Station) and direct transmission from a BS to an MS.

FIGS. 1A and 1B illustrate an exemplary configuration of a conventional wireless RS multi-hop system.

FIG. 1A illustrates the configuration of a wireless RS multi-hop system with six wireless RSs. Referring to FIG. 1A, a cell 110 includes a BS 111 and six wireless RSs 112-117. An MS 118 near to the BS 111 receives a service from the BS 111, whereas an MS 119 at a cell boundary and thus having a relatively low Signal-to-Interference and Noise Ratio (CINR) receives a service from the RS 112.

FIG. 1B illustrates subcells 1-6 covered by six wireless RSs 121-126 within cell 127. The use of the RSs 121-126 effectively splits the single cell illustrated in FIG. 1A into seven cells. Because of the cell splitting, the wireless RS multi-hop system can efficiently transmit data to MSs which are located at the cell boundary or having a poor channel status or in areas having many obstacles. Consequently, the service area of the BS is expanded and shadow areas are substantially eliminated.

Compared to a conventional repeater system in which a repeaters are used to amplify the received signal, and amplify even interference from an external cell as well, a wireless RS transmits only an intended signal to an MS and can perform scheduling/RRM for MSs within the subcell covered by the RS in the wireless RS multi-hop system. In this manner, the use of wireless RSs enables data transmission to MSs in a shadow area to which the BS cannot directly transmit data and increases cell coverage and transmission throughput through additional scheduling/RRM.

While the wireless RS multi-hop system improves the reception SINRs of MSs at the cell boundary, compared to the conventional single-hop system or repeater system, it requires additional data transmission to relay data. Because transmission from a BS to an RS also occupies radio resources, part of a transmission frame should always be spared for a BS-RS link. With this limitation, as more MSs request service, each serving node (e.g. BS or RS) allocates less frequency resources at the same time and repeated transmission causes a waste of time resources. Moreover, when data is delivered to an MS over a plurality of hops, resource distribution inefficiency is increased. The resulting decrease in effective channel resources available to MSs decreases transmission throughput.

The above problems may be averted by improved scheduling/RRM, use of directional antennas, or frequency or time reuse. Nonetheless, the wireless RS multi-hop system has distinctive limitations in terms of efficient resource utilization and especially transmission throughput. Because the channel status of links involved between a BS to an MS are different, scheduling/RRM becomes very difficult and complex, if all channels on the links are considered. Also, there will be a constraint on transmission of control signals in scheduling based on information exchanged between each RS and a BS.

These limitations are caused by data transmission on a wireless link between a BS and an RS and repeated transmission of the same resources from the BS to the RS. Hence, an RoF RS technology, i.e. a wired RS system is under study, which connects a BS to an RS by an optical fiber offering excellent frequency characteristics and less data loss.

SUMMARY OF THE INVENTION

An aspect of exemplary embodiments of the present invention is to address at least the problems and/or disadvantages noted above and to provide at least the advantages described below. Accordingly, an aspect of exemplary embodiments of the present invention is to provide a method for increasing transmission throughput in a wired RS system.

Another aspect of exemplary embodiments of the present invention is to provide a method for increasing transmission throughput in a wired RS multi-hop system using a resource reuse scheme.

In accordance with an aspect of exemplary embodiments of the present invention, there is provided a scheduling method in a cellular system using a wired RS, in which a BS collects CQIs (Channel Quality Information) of all MSs within a cell, calculates a transmittable data amount for each of the MSs according to the CQI, selects an MS having a highest PF (Proportional Fairness) metric, and allocates resources to the selected MS.

BRIEF DESCRIPTION OF THE DRAWINGS

The above features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. For the purposes of clarity and simplicity, descriptions of well-known functions and constructions are omitted for clarity and conciseness.

Figure 2A:
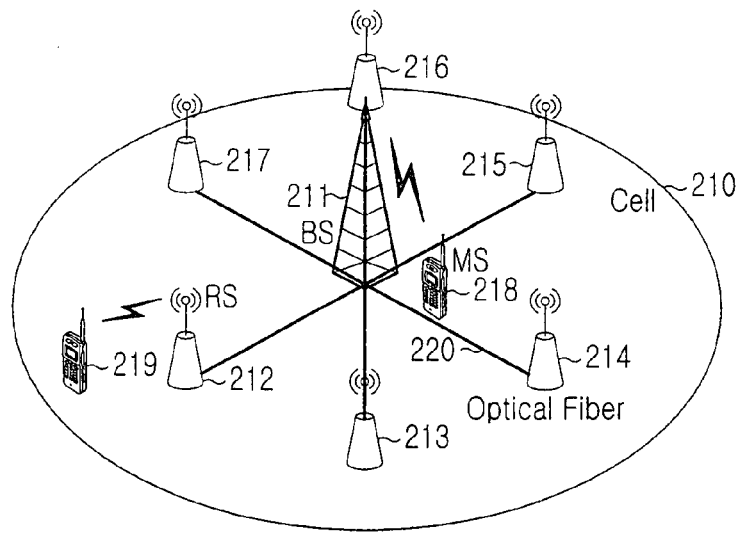
FIGS. 2A and 2B illustrate the configuration of a wired RS cellular system, to which the present invention is applied.
Figure 2B:
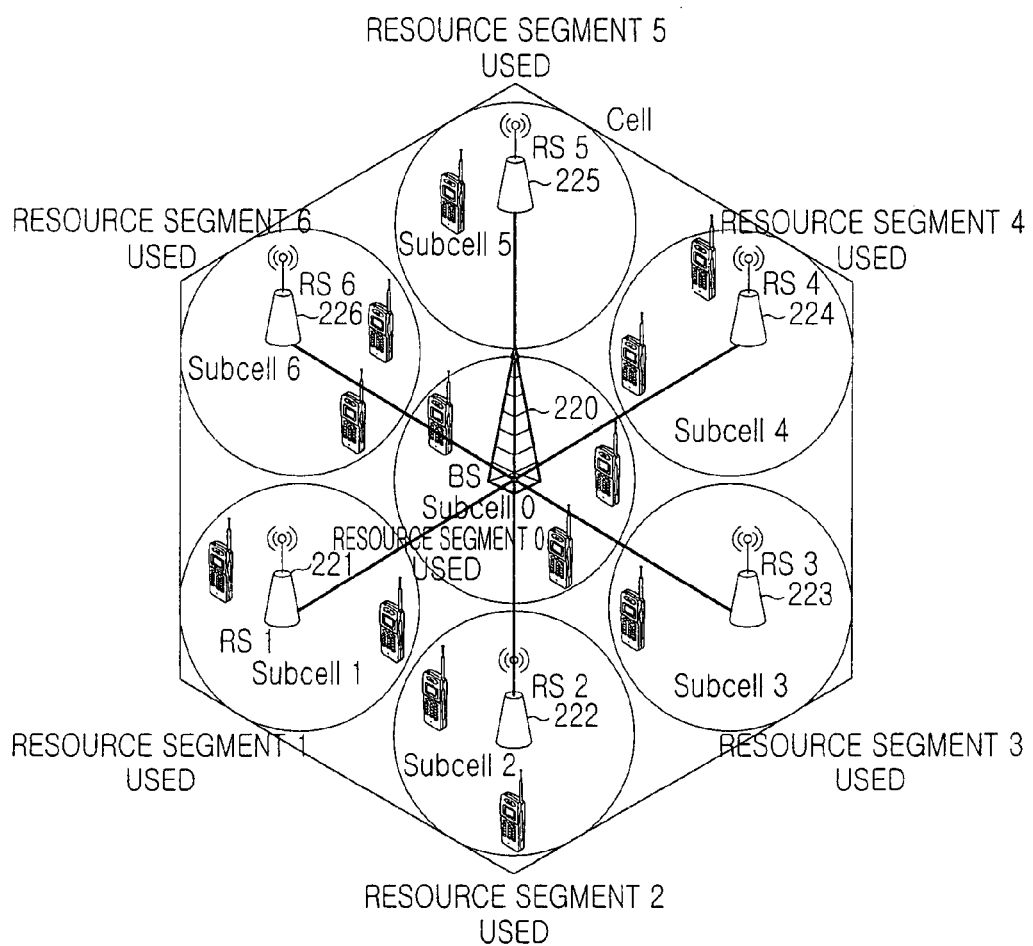

FIGS. 2A and 2B illustrate the configuration of a wired RS cellular system to which the present invention is applied.

Figure 1A:
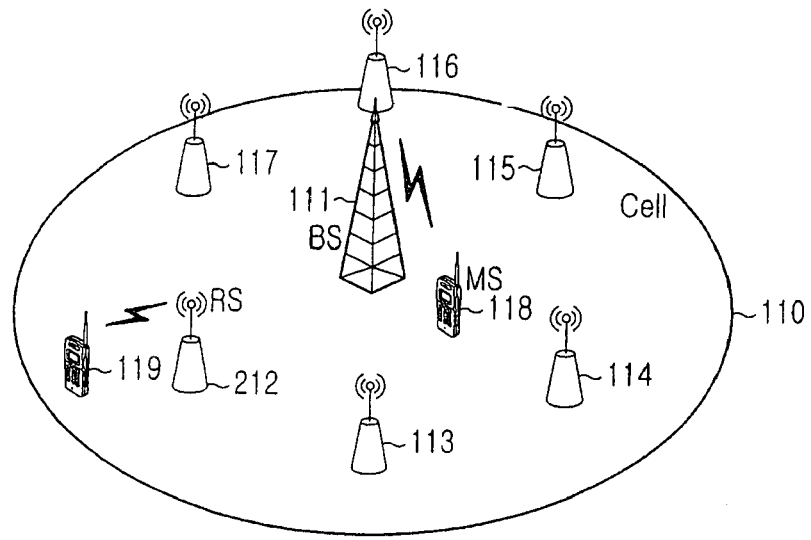
FIGS. 1A and 1B illustrate an exemplary configuration of a conventional multi-hop relay cellular system using wireless RSs.
Figure 1B:
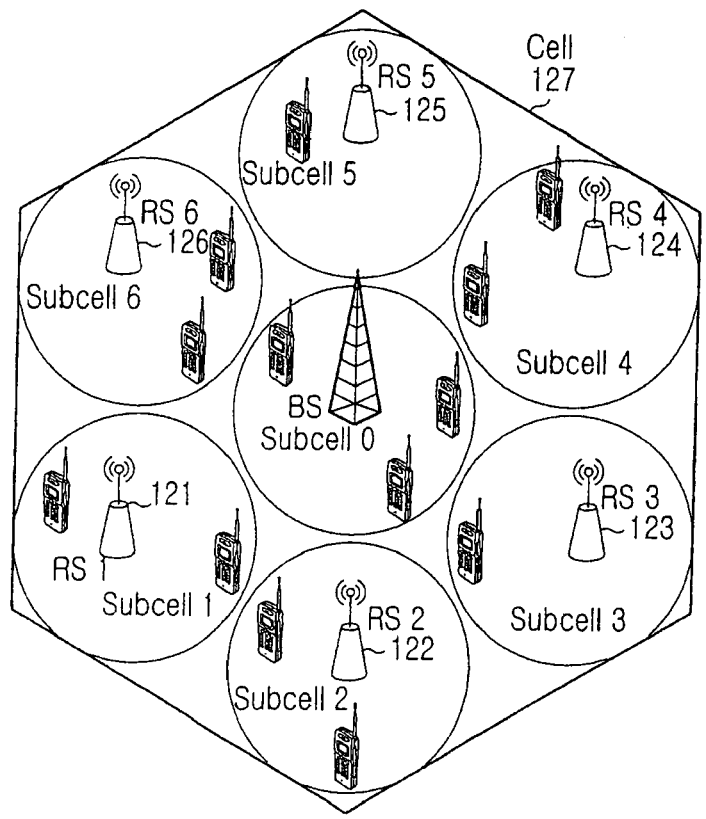

In FIGS. 2A and 2B, the wired RS system has a network configuration similar to that of a wireless RS multi-hop system. FIG. 2A illustrates a wired RS system with six RSs. Referring to FIG. 2A, the wired RS system is similar to the wireless RS system illustrated in FIG. 1A in that a single cell 210 includes one BS 211 and six RSs 212-217 and they differ in that BS-RS links are formed by optical fibers 220 in the wired RS system. Despite additional cost for installing optical fibers between the BS and the RSs and fixedness of the RSs, the wired RS system offers the following benefits.

First, the wired RS system experiences only minimal signal attenuation on the BS-RS links owing to the use of optical fibers. Another benefit is that as radio resources are saved compared to the wireless RS system, many users can further be allocated resources. Further, since more control signals can be transmitted due to the radio resource saving, various intelligent scheduling techniques are viable. Compared to the wireless RS system, a variety of multi-hop networks can be designed.

Consequently, the transmission throughput of individual users and the entire cell is increased. Each RS acts as a small BS. Thus, as an ideal transmission throughput increases in proportion to the number of RSs per hop, hardware cost decreases gradually, and frequency resource cost increases continually, the wired RS system will eventually outperform the wireless RS system.

If every node uses the same frequency or time resources in a cellular system, MSs are affected by intra-cell interference and inter-cell interference from nodes using the same resources as those of their serving nodes and thus suffer from a decrease in reception SINRs. To reduce the interference and increase resource efficiency, a cell uses resources which are the same as those of a remote cell and different from those of a neighbor cell. This is called frequency reuse or time reuse. The frequency reuse or time reuse is also applicable to the wired RS system in a similar manner.

Figure 3A:
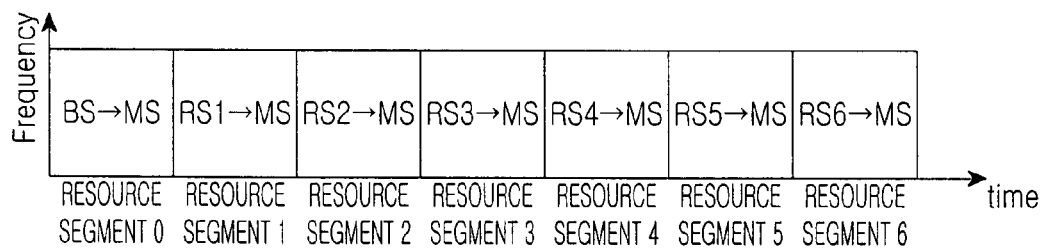
FIGS. 3A and 3B illustrate resource allocation based on time reuse in the wired RS cellular system according to an exemplary embodiment of the present invention.

FIG. 2B illustrates a frequency reuse with a frequency reuse factor of 7 in a wired RS system with the same RS layout as illustrated in FIG. 2A. A BS 220 and RSs 221-226 within subcells transmit data in seven resource segments of a frame according to a time reuse scheme, as illustrated in FIG. 3A. Specifically, the BS allocates resources to MSs that it serves and transmits data to them in resource segment 0 defined on a time axis, and discontinues the transmission in resource segment 1. At the same time, RS1 starts transmission in resource segment 1. In the same manner, RS2 to RS6 transmit data in corresponding resource segments 2 to 6, respectively. According to the time reuse scheme, each node should complete its transmission during a predetermined time period, thereby avoiding intra-cell/inter-cell interference. However, the reuse factor and the transmission throughput are in a trade-off relationship and the fixed resource segments for the nodes as illustrated in FIG. 3A are not effective in flexibly coping with different traffic requirements of MSs within the subcells.

The above frame resource division method is referred to as "static frame division" and problems encountered with the static frame division will be described below.

Figure 3B:
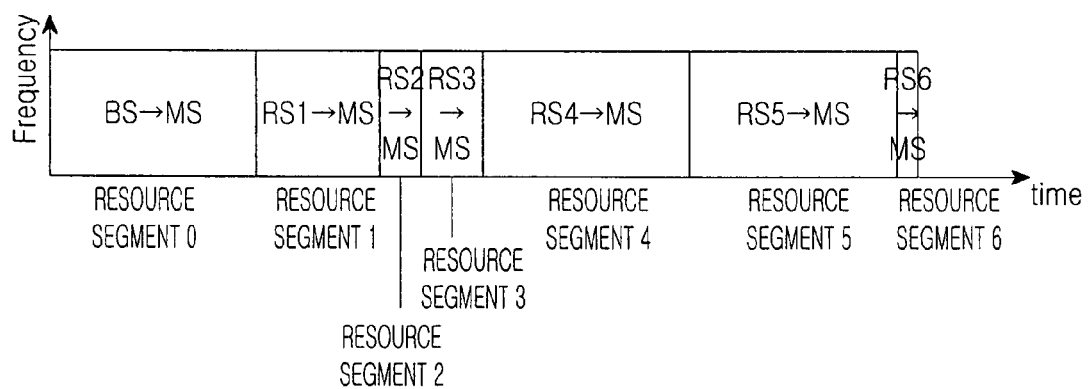

For example, if MSs within subcells 0, 4 and 5 request Near Real Time Video (NRTV) data, MSs within subcells 2 and 6 request Voice over Internet Protocol (VoIP) data, and MSs within subcells 1 and 3 request Hypertext Transfer Protocol (HTTP) data, which is a situation that MSs within a cell are concentrated around a particular node or a particular node requests a larger amount of traffic, relatively more traffic should be allocated to the NRTV data during a given transmission period because a high data rate should be ensured for the NRTV data in real time. However, the data transmission is discontinued in the next resource segment in the static frame division illustrated in FIG. 3A. As a result, a required minimum data rate is not satisfied during a scheduling time or a transmission frame period, and thus Quality of Service (QoS) is not guaranteed. On the other hand, excess resources are allocated to subcells 2 and 6 with the VoIP data and subcells 1 and 3 with the HTTP data. The static frame division does not reflect various traffic characteristics. Therefore, as illustrated in FIG. 3B, frame segments 0, 4 and 5 are expanded, while the other frame segments are made smaller, to thereby actively cope with the above-described different traffic situations.

In contrast to the static frame division, dividing a frame variably according to a data transmission environment is called "dynamic frame division". A BS and each RS perform scheduling and RRM independently in the static frame division scheme, whereas a BS collects information about the channel status of MSs covered by RSs from the RSs and performs scheduling/RRM for them in the dynamic frame division scheme.

Scheduling is very crucial to maximization of transmission throughput and system efficiency, while satisfying QoS requirements from users and providing fairness among MSs. The scheduling is an algorithm that determines time to allocate resources, frequency resources to be allocated, and the MSs to be allocated the resources. In the wired RS multi-hop system, nodes allocate resources in a transmission frame by various scheduling algorithms.

Regarding a Proportional Fairness (PF) scheduling according to the present invention, it is one of opportunistic scheduling techniques that select an optimal user under various conditions such as QoS or channel information, seeking to maximize multiple user gains. If there are data to be transmitted to a plurality of users in a cell, a PF scheduler collects information about the channel status of the users and determines a maxim transmittable data amount for each user according to the channel status information. Then the PF scheduler calculates the ratio of an available maximum instantaneous data rate to an average data rate or a PF priority metric for every user. This value is a scheduling priority level and a user having the highest priority level is selected to receive data in a current time slot. Also, the PF scheduling is performed in parallel for each frequency band, for resource allocation.

$$\text{PF metric for ith MS} = \frac{R_i(t)}{\overline{R_i(t)}} \quad (1)$$

where i denotes the index of an MS and $R_i(t)$ denotes a data rate available to the $i^{th}$ MS in a scheduling time period t. $R_i(t)$ is calculated based on the Channel Quality Information (CQI) of a previous frame, such as average Carrier-to-Interference and Noise Ratio (CINR), which the MS feeds back to its serving node.

$\overline{R_i(t)}$ denotes the average data rate of data transmitted to the $i^{th}$ MS from a previous time period to the scheduling time period t. The ratio between these two factors is the priority function of the $i^{th}$ MS. The PF scheduler calculates a PF metric for every MS, selects an MS with the largest PF metric by Equation (2), and allocates resources to the selected MS in the scheduling time period t.

$$i^* = \arg\max \left\{ \frac{R_i(t)}{\overline{R_i(t)}} \right\} \quad (2)$$

where i* denotes the selected MS in the scheduling time period t.

According to Equation (1) and Equation (2), the average data rate $\overline{R_i(t)}$ becomes higher for an MS that has a high CQI and thus receives a relatively large amount of data in a prior time period. Thereafter, the PF metric of the MS decreases over time, which in turn decreases the priority level of the MS. Then, the MS has fewer opportunities of resource allocation. On the other hand, for an MS with a relatively low CQI, the average data rate $\overline{R_i(t)}$ becomes lower. Therefore, the PF metric of the MS increases over time, which in turn increases the priority level of the MS. Then, the MS has more opportunities of resource allocation.

In this manner, the PF metric leads to allocation of time and frequency resources offering a maximal transmission throughput, taking into account the channel status of each MS. Therefore, although the PF scheduling is inferior to Round Robin (R/R) scheduling in terms of absolute fairness, it can increase transmission throughput because of its fairness in CQI. After selecting the MS for the scheduling time period t and allocating resources to the selected MS in the above manner, $\overline{R_i(t)}$ is updated for the scheduling time period t by weighted averaging according to Equation (3).

$$\overline{R_i(t)} = \left(1 - \frac{1}{t_c}\right) R_i(t-1) + \frac{1}{t_c} R_i(t-1) \quad \text{for } i = i^* \quad (3)$$

$$\overline{R_i(t)} = \left(1 - \frac{1}{t_c}\right) R_i(t-1) \quad \text{for } i \neq i^*$$

If resources were allocated to the $i^{th}$ MS in a previous scheduling time period (t−1), $\overline{R_i(t)}$ is updated for the scheduling time period t by the upper formula in Equation (3) and if resources were not allocated to the $i^{th}$ MS for the scheduling time period (t−1), $\overline{R_i(t)}$ is updated for the scheduling time period t by the lower formula in Equation (3). A weight $t_c$ is set to a maximum time period for which the MS is not serviced. As $t_c$ becomes smaller, weights, being the coefficients of the terms in Equation (3), get larger. In this case, the PF scheduling becomes similar to the R/R scheduling that sequentially allocates resources of the same size.

Figure 4:
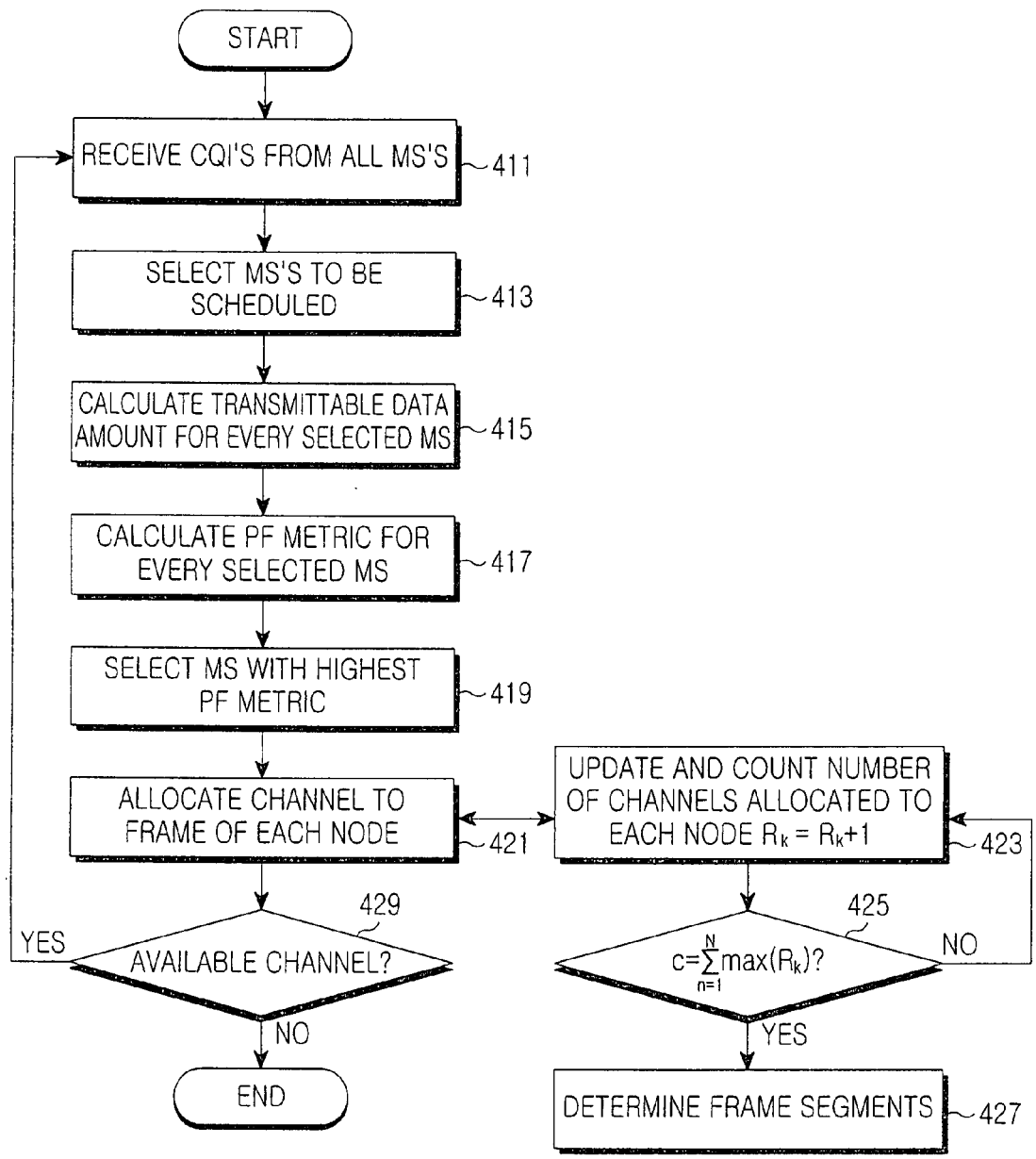
FIG. 4 is a flowchart illustrating a scheduling method in the wired RS cellular system according to an exemplary embodiment of the present invention.

FIG. 4 is a flowchart illustrating a scheduling method in the wired RS cellular system according to an exemplary embodiment of the present invention.

Referring to FIG. 4, it is assumed that a serving node (BS or RS) has been determined for each MS before scheduling. Nodes using the same resource segment are called a reuse group so that the scheduling operation is applicable for a reuse factor of 3 (illustrated in FIG. 5A) as well as for a reuse factor of 7 (illustrated in FIG. 2B). It is also assumed that a cell has k RSs and (k+1) nodes inclusive of a BS, N reuse groups are formed, including the BS, and a time reuse scheme is adopted as illustrated in FIG. 3A. A transmission frame has C resources and the number of resources allocated to a frame for a $k^{th}$ node is $R_k$.

In step 411, MSs feed back their CQIs to the BS and all RSs, i.e. their serving nodes, and the BS receives the CQIs via the RSs, thus collecting all CQIs within the cell. The BS selects MSs to be scheduled in step 413 and calculates the numerator $R_i(t)$ of Equation (1). That is, a transmittable data amount for every selected MS in step 415 and calculates an average data rate $\overline{R_i(t)}$ and a PF metric for every selected MS in step 417. In step 419, the BS selects an MS with the highest PF metric by Equation (2).

Steps 415, 417 and 419 are performed for PF scheduling. The selected MS is an MS with the highest PF metric not in a subcell but in the entire cell. If the PF scheduling is performed on a frequency band-by-frequency band basis, i.e. the PF scheduling is performed in parallel, as many MSs are selected for resource allocation with respect to the frequency bands at one scheduling.

In step 421, the BS allocates resources to a frame for the serving node of the selected MS (scheduling is performed for every MS in the cell). If resources are reused, steps 421 and 423 are performed simultaneously. In step 423, the BS counts the number of resources allocated to the frame of each node and proceeds to step 425.

The BS detects one node having the most allocated resources from each reuse group for a current scheduling time and compares the sum of resources allocated to the detected nodes with the total number C of resources per transmission frame in step 425. If the sum is not equal to C, the resource allocation is repeated until they equal. If the sum is equal to C, the BS determines boundaries among frame segments according to the sizes of the allocated resources in step 427.

If there are resources unused for each node in step 429, the BS allocates the resources to the frame segments determined in step 427 and completes the scheduling. Each node transmits the resource-allocated frame, thus finishing one cycle. Then the above operation is repeated.

As the operation is repeated, the CQIs of the MSs change every scheduling time and the traffic requirement of each MS changes. Therefore, the frame segments vary dynamically.

Figure 5A:
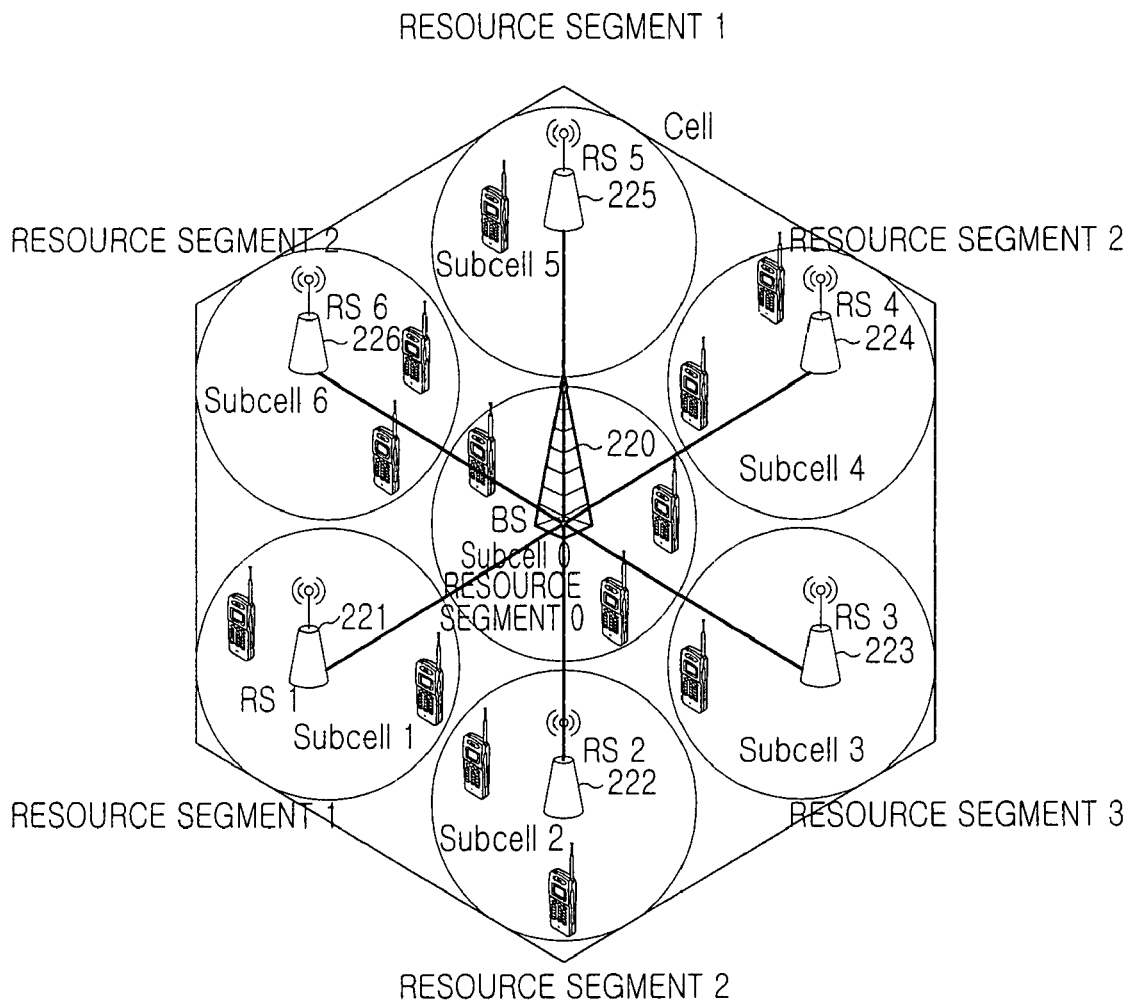
FIGS. 5A to 5D illustrate resource allocations based on time reuse in the wired RS cellular system according to an exemplary embodiment of the present invention.
Figure 5B:
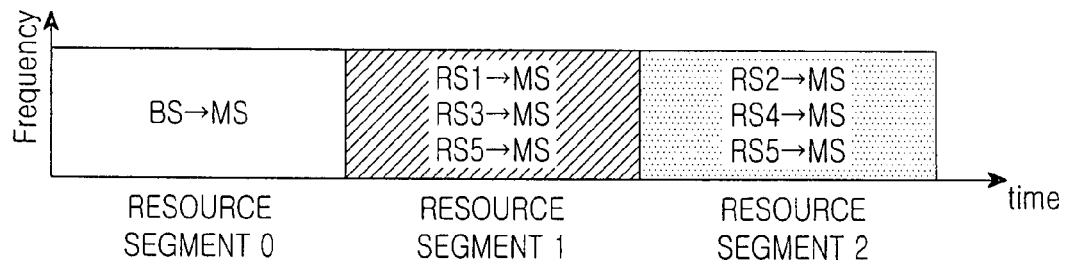
Figure 5C:
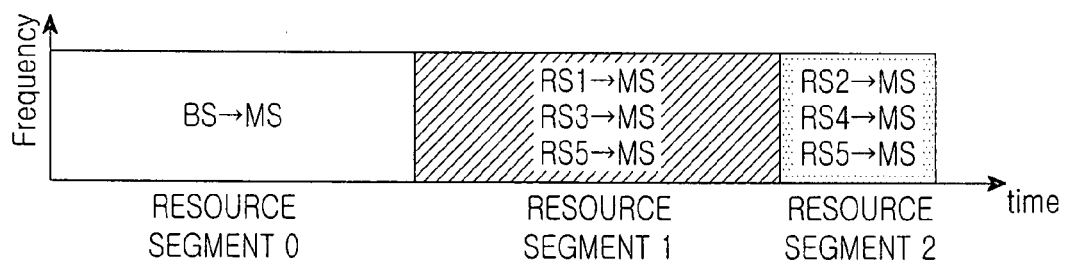
Figure 5D:
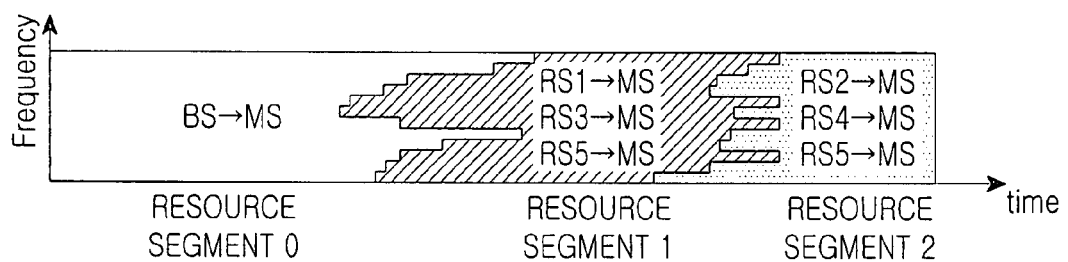

FIGS. 5B and 5C illustrate examples of static frame division and dynamic frame division for a wired RS system with a subcell configuration illustrated in FIG. 5A. Here, resources are divided in time. The dynamic frame division of the present invention is applicable to frequency resources as well as time resources. In FIG. 5D, the scheduling of the present invention is performed in parallel for respective frequency bands and thus two dimensional time-frequency resources are frame-divided.

Figure 6:
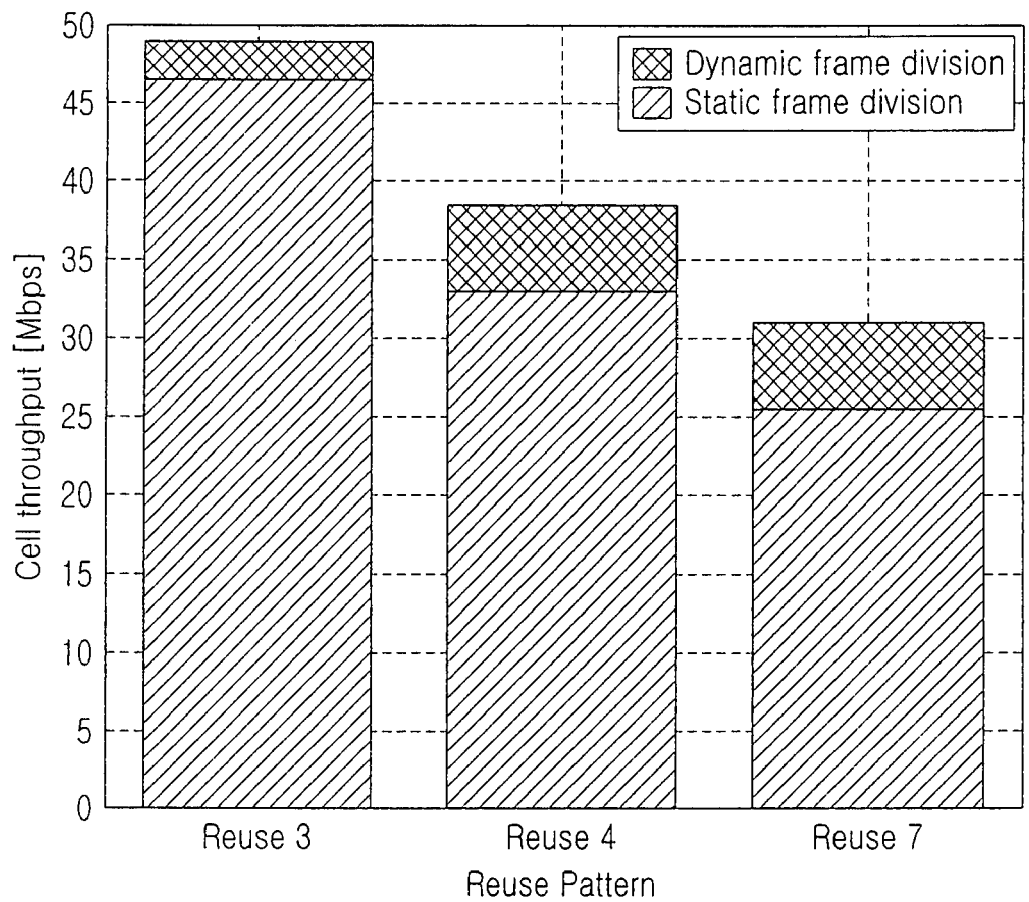
FIG. 6 is a graph illustrating simulation results of the scheduling method in the wired RS cellular system according to an exemplary embodiment of the present invention.

FIG. 6 illustrates improved transmission throughput when the scheduling of the present invention is used in a wired RS multi-hop system. A simulation was performed under the following conditions.

Cell structure: hexa cells (1 BS and 6 RSs)
Number of simulation occurrences: 50000
Traffic model: full queue model
Number of MSs: 120
Reuse factor: 3/4/7
Channel model: Rayleigh fading
Interference model: interference from nodes using the same resources in six neighbor cells is considered.
Path loss model: Lee's model
Scheduling: scheduling based on BS-centralized dynamic fame division of the present invention.

Referring to FIG. 6, the BS-centralized scheduling scheme of the present invention increases transmission throughput by 6.8%, 16.3%, and 22.3% respectively for reuse factors of 3, 4 and 7, compared to the static frame division The performance increases with the reuse factor according to the present invention.

In accordance with the present invention, a frame is dynamically divided by centralized scheduling based on an PF metric that reflects the channel status of all MSs within a cell in a wired RS cellular system. Since scheduling is performed, taking into account traffic situations and channel information, transmission throughput is increased.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose compute (e.g, Pentium processor), or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A scheduling method of a Base Station (BS) in a cellular system using a wired Relay Station (RS), comprising:
collecting by the base station Channel Quality Information (CQIs) of all Mobile Stations (MSs) within a cell of a plurality of cells and the BS receiving CQIs via at least one respective wired RS per cell that is wired to the BS and receives data in resource segments of a frame, and each of said at least one respective wired RS per cell communicates wirelessly with the MSs within a respective cell of the plurality of cells;
calculating a transmittable data amount for each of the MSs according to the CQIs; and
selecting an MS having a highest PF metric and allocating resources to the selected MS, the PF metric being defined as:

$$PF \text{ metric for } ith\ MS = \frac{R_i(t)}{\overline{R_i(t)}} \quad (4)$$

where i denotes the index of an MS,
$R_i(t)$ denotes a data rate available to an $i^{th}$ MS in a scheduling time period t, and
$\overline{R_i(t)}$ denotes the average data rate of data transmitted to the $i^{th}$ MS from a previous time period to the scheduling time period t:
and the MS having the highest PF metric being expressed as:

$$i^* = \arg\max\left\{\frac{R_i(t)}{\overline{R_i(t)}}\right\} \quad (5)$$

where i* denotes the selected MS in the scheduling time period t;
and wherein the RS is wired to the BS via optical fiber.

2. The method of claim 1, further comprising:
updating $\overline{R_i(t)}$ when selecting MSs to be scheduled and allocating resources for the scheduling time period t as:

$$\overline{R_i(t)} = \left(1 - \frac{1}{t_c}\right)R_i(t-1) + \frac{1}{t_c}R_i(t-1) \quad \text{for } i = i^* \quad (6)$$

$$\overline{R_i(t)} = \left(1 - \frac{1}{t_c}\right)R_i(t-1) \quad \text{for } i \ne i^*$$

where $t_c$ is set to a maximum time period for which the $i^{th}$ MS is not serviced.

3. The method of claim 1, further comprising:
dynamically dividing a frame by counting the number of resource segments allocated to a frame of each node being the BS or an RS.

4. The method of claim 3, wherein the dynamic frame division comprises:
detecting one node having the most allocated resources for a current scheduling time period from each reuse group;
comparing a sum of resources allocated to detected nodes with the total number of resources per transmission frame; and
determining boundaries among frame resource segments according to the sizes of the allocated resources if the sum is equal to the total number of resources per transmission frame.

5. The method of claim 3, wherein the dynamic frame division comprises:
dividing two-dimensional time and frequency resources of the frame.

6. An apparatus for scheduling of a Base Station (BS) in a cellular system using a wired Relay Station (RS), comprising:
a processor in communication with a memory, the memory storing software instruction which when accessed by the processor causes the processor to execute:
collecting by the Base Station Channel Quality Information (CQIs) of all Mobile Stations (MSs) within a cell of a plurality of cells and the BS receiving CQIs via at least one respective wired RS per cell that is wired to the BS and receives data in resource segments of a frame, and each of said at least one respective wired RS per cell communicates wirelessly with the MSs within a respective cell of the plurality of cells;

calculating a transmittable data amount for each of the MSs according to the CQIs; and selecting an MS having a highest PF metric and allocating resources to the selected MS, the PF metric being defined as:

$$PF \text{ metric for } ith \text{ } MS = \frac{R_i(t)}{\overline{R_i(t)}} \quad (4)$$

where i denotes the index of an MS, $R_i(t)$ denotes a data rate available to an $i^{th}$ MS in a scheduling time period t, and $\overline{R_i(t)}$ denotes the average data rate of data transmitted to the $i^{th}$ MS from a previous time period to the scheduling time period t;

and the MS having the highest PF metric being expressed as:

$$i^* = \arg\max\left\{\frac{R_i(t)}{\overline{R_i(t)}}\right\} \quad (5)$$

where i* denotes the selected MS in the scheduling time period t; and wherein the RS is wired to the BS via optical fiber.

7. The apparatus of claim 6, wherein the software instruction further causing the process to execute:

updating $\overline{R_i(t)}$ when selecting MSs to be scheduled and allocating resources for the scheduling time period t as:

$$\overline{R_i(t)} = \left(1 - \frac{1}{t_c}\right)R_i(t-1) + \frac{1}{t_c}R_i(t-1) \quad \text{for } i = i^* \quad (6)$$

$$\overline{R_i(t)} = \left(1 - \frac{1}{t_c}\right)R_i(t-1) \quad \text{for } i \neq i^*$$

where $t_c$ is set to a maximum time period for which the $i^{th}$ MS is not serviced.

8. The apparatus of claim 6, wherein the software instruction further causing the process to execute:

dynamically dividing a frame by counting the number of resource segments allocated to a frame of each node being the BS or an RS.

9. The apparatus of claim 8, wherein the dynamic frame division comprises:

detecting one node having the most allocated resources for a current scheduling time period from each reuse group;

comparing the sum of resources allocated to detected nodes with the total number of resources per transmission frame; and determining boundaries among frame resource segments according to the sizes of the allocated resources if the sum is equal to the total number of resources per transmission frame.

10. The apparatus of claim 8, wherein the dynamic frame division comprises:

dividing two-dimensional time and frequency resources of the frame.

11. The method of claim 1, wherein said mobile stations transmit CQI information in a designated time slot.

12. The apparatus of claim 6, wherein said mobile stations transmit CQI information in a designated time slot.

13. The computer product of claim 1, wherein said mobile stations transmit CQI information in a designated time slot.

14. The method of claim 1, wherein $R_i(t)$ is calculated based on the Channel Quality Information (CQI) of a previous frame, said CQI represented as average Carrier-to-Interference and Noise Ratio (CINR).

15. The apparatus of claim 1, wherein $R_i(t)$ is calculated based on the Channel Quality Information (CQI) of a previous frame, said CQI represented as average Carrier-to-Interference and Noise Ratio (CINR).

16. The product of claim 1, wherein $R_i(t)$ is calculated based on the Channel Quality Information (CQI) of a previous frame, said CQI represented as average Carrier-to-Interference and Noise Ratio (CINR).

* * * * *